(12) United States Patent
Collins

(10) Patent No.: US 7,651,169 B2
(45) Date of Patent: Jan. 26, 2010

(54) STRAP RETAINER FOR SHOPPING CART SEATBELTS

(75) Inventor: Donald P. Collins, East Canton, OH (US)

(73) Assignee: French Components Corporation, Twinsburg, OH (US)

( * ) Notice: Subject to any disclaimer, the term of this patent is extended or adjusted under 35 U.S.C. 154(b) by 389 days.

(21) Appl. No.: 11/278,923

(22) Filed: Apr. 6, 2006

(65) Prior Publication Data
US 2006/0226693 A1  Oct. 12, 2006

Related U.S. Application Data

(60) Provisional application No. 60/669,113, filed on Apr. 7, 2005.

(51) Int. Cl.
*A62B 35/00* (2006.01)

(52) U.S. Cl. ........................... 297/485; 297/468

(58) Field of Classification Search ........... 297/468, 297/464, 469, 485; 24/598.2, 265 AL, 71 SB, 24/68 SB, 182, 704.1, 704.2, 579.09, 579.11, 24/198

See application file for complete search history.

(56) References Cited

U.S. PATENT DOCUMENTS

| | | | | |
|---|---|---|---|---|
| 627,370 | A | * | 6/1899 | Weiss ........................... 24/308 |
| 1,327,534 | A | | 1/1920 | Eichstedt |
| 1,639,574 | A | | 8/1927 | Reiter |
| 1,672,505 | A | | 6/1928 | Stocker |
| 1,887,491 | A | | 11/1932 | Johnson |
| 2,286,258 | A | | 6/1942 | Bubenic |
| 2,664,610 | A | * | 1/1954 | Hannemann ................. 24/323 |
| 3,030,685 | A | | 4/1962 | Reiter |
| 3,439,387 | A | | 4/1969 | Churches |
| 3,595,506 | A | | 7/1971 | Saunders |
| 3,605,199 | A | | 9/1971 | Eberhardt |
| 3,624,813 | A | * | 11/1971 | Gaylord ................... 294/82.29 |
| 3,654,049 | A | | 4/1972 | Ausnit |
| 3,765,329 | A | | 10/1973 | Kirkpatrick et al. |
| 3,852,982 | A | | 12/1974 | Faris |
| 3,863,477 | A | | 2/1975 | Klein |
| 3,914,831 | A | * | 10/1975 | Steinberg ................ 24/265 AL |
| 4,128,918 | A | | 12/1978 | Wenk |
| 4,361,258 | A | | 11/1982 | Clark |
| 4,411,049 | A | | 10/1983 | Cristea |
| 4,561,676 | A | | 12/1985 | Trubiano |
| 4,627,622 | A | | 12/1986 | Spilhaus |
| 4,637,622 | A | | 1/1987 | Burgard |
| 4,854,607 | A | | 8/1989 | Mandracchia et al. |
| 5,026,088 | A | | 6/1991 | Stuart |
| 5,135,075 | A | | 8/1992 | Aten, Jr. et al. |

(Continued)

*Primary Examiner*—Milton Nelson, Jr.
(74) *Attorney, Agent, or Firm*—Hahn Loeser + Parks LLP; Jason R. Strobel

(57) ABSTRACT

A strap retainer comprising a flexible elongated member is formed in a partially closed loop. The elongated member may have an approximately straight segment near one end, and an L-shaped restraining member is positioned on the elongated member adjacent to the straight segment. The strap fastener has an un-locked, open position, and a locked, closed position, such that when in the locked, closed position the elongate member forms a closed loop. When a webbing strap passes through the strap fastener in its unlocked, open position, the strap may be placed between the L-shaped restraining member and the straight segment, whereby the L-shaped restraining member inhibits the strap from moving longitudinally along the elongate member.

9 Claims, 4 Drawing Sheets

U.S. PATENT DOCUMENTS

| | | |
|---|---|---|
| 5,197,164 A | 3/1993 | Meier |
| 5,203,613 A | 4/1993 | Ward |
| 5,248,462 A | 9/1993 | Brotz |
| 5,263,726 A | 11/1993 | Wood |
| 5,290,965 A | 3/1994 | Yoshida et al. |
| 5,364,137 A | 11/1994 | Shimer |
| 5,439,253 A | 8/1995 | Trubiano |
| D365,050 S | 12/1995 | Shimer et al. |
| 5,474,487 A | 12/1995 | Roush et al. |
| 5,497,818 A | 3/1996 | Marcarelli |
| 5,527,096 A | 6/1996 | Shimer |
| 5,542,156 A | 8/1996 | Oglesby |
| 5,564,778 A | 10/1996 | Shimer et al. |
| 5,611,597 A | 3/1997 | Lanz |
| 5,669,118 A | 9/1997 | Frano et al. |
| 5,781,970 A | 7/1998 | Anscher |
| 5,868,369 A | 2/1999 | Montgomery |
| 5,915,631 A | 6/1999 | Laxton et al. |
| 5,920,968 A | 7/1999 | Anscher |
| 5,940,944 A | 8/1999 | Anscher |
| 6,044,528 A | 4/2000 | Schottin |
| 6,088,885 A | 7/2000 | Galbreath |
| 6,101,687 A | 8/2000 | Giampavolo et al. |
| 6,101,690 A | 8/2000 | Giampavolo et al. |
| 6,134,854 A | 10/2000 | Stanchfield |
| 6,267,276 B1 | 7/2001 | Cook |
| 6,298,524 B1 | 10/2001 | Officer |
| 6,484,375 B1 | 11/2002 | Nishida et al. |
| 6,520,511 B2 | 2/2003 | Gonthier |
| 6,604,265 B2 | 8/2003 | Giampavolo |
| 6,618,915 B2 | 9/2003 | Giampavolo |
| 6,694,921 B2 | 2/2004 | Emerick |
| 6,701,579 B1 | 3/2004 | De La Pena Razquin |
| 6,736,567 B1 | 5/2004 | Dibello |
| 6,745,439 B2 | 6/2004 | Brownlee et al. |
| 6,807,715 B1 | 10/2004 | Blair |
| 2002/0158433 A1 | 10/2002 | de Naurois et al. |
| 2003/0097736 A1 | 5/2003 | Blankenship |
| 2004/0061297 A1 | 4/2004 | Booker |
| 2004/0083525 A1 | 5/2004 | Wells, Jr. |
| 2004/0089311 A1 | 5/2004 | Graupner |
| 2004/0134046 A1 | 7/2004 | Giampavolo |
| 2004/0145158 A1 | 7/2004 | Giampavolo et al. |
| 2004/0204302 A1 | 10/2004 | Flynn |
| 2004/0267293 A1 | 12/2004 | Byrum et al. |

* cited by examiner

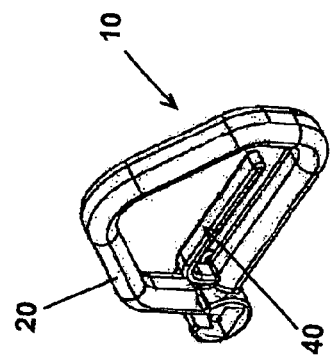
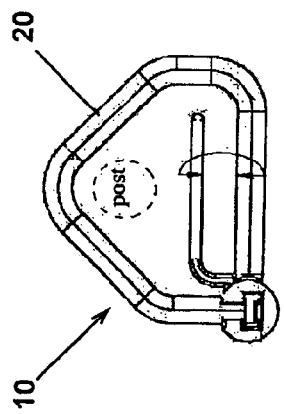
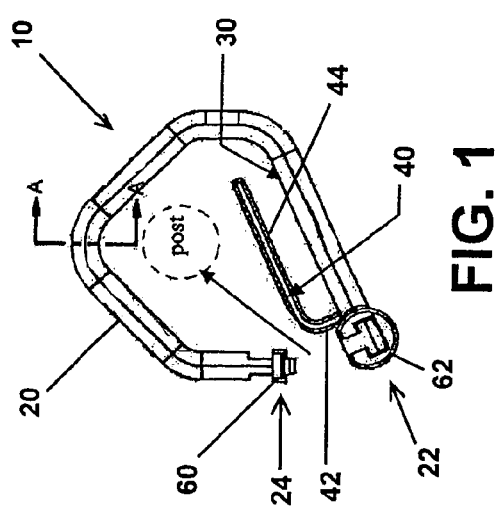
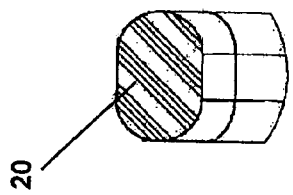

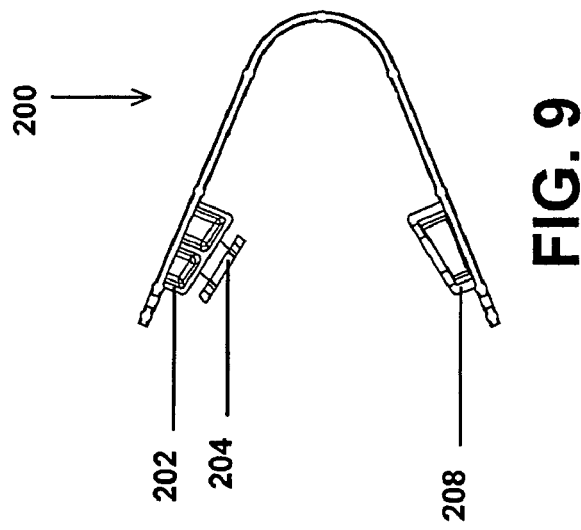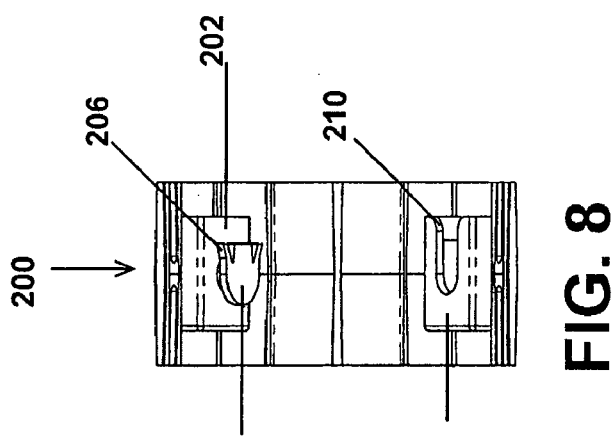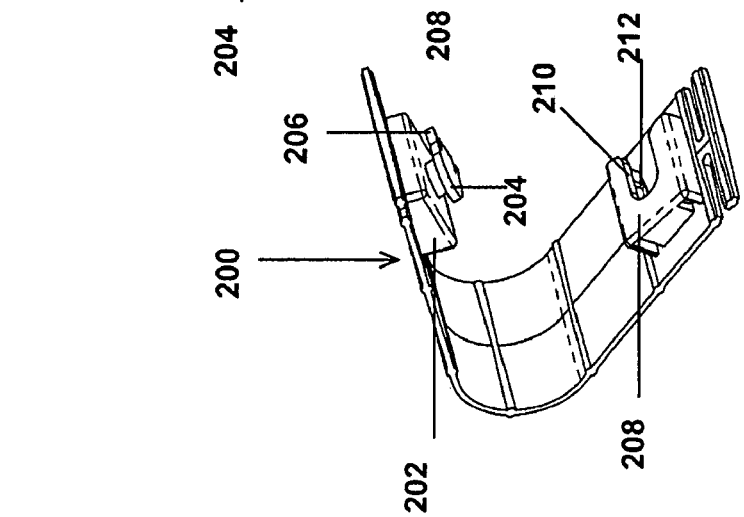

STRAP RETAINER FOR SHOPPING CART SEATBELTS

This application claims the benefit of U.S. provisional patent application Ser. No. 60/669,113, filed Apr. 7, 2005, which is hereby incorporated by reference.

BACKGROUND

The present invention relates to strap retainers, and more particularly to strap retainers for securing child restraining straps onto shopping carts or other vehicles.

Shopping carts are often equipped with straps for securing a child in a seating area. The straps typically include a length of nylon, polyester or polypropylene webbing that is secured to the cart with one or more strap retainers. The strap retainers may be D-rings, clips, or other fasteners to ensure that the strap does not detach from the cart when in use. Often the child strap apparatus will include a buckle to make it easier for a shopper to clip the strap around a child.

Some prior art strap retainers include two ends that form a locking member, such that the strap retainer forms a closed loop when the locking member is locked, but comprises an open post when the locking member is unlocked. The strap retainer may attach to the webbing by passing the open post of the unlocked member through a loop in the webbing. These designs allow an operator to place the open post of the unlocked strap retainer around a frame member or other feature on the shopping cart, and then lock the locking member to form the closed loop that secures the strap retainer to the shopping cart.

A strap manufacturer may assemble the components of the strap assembly and then ship them to a cart manufacturer to install onto new carts, or a retail store to replace worn or damaged straps. Many manufacturers prefer to ship the strap assemblies with the strap retainers attached for easy assembly onto the shopping carts at their destination.

A disadvantage in the prior art strap retainers is that when the open post engages a loop in the strap or webbing, the loop can easily slide off of the open post during shipping. This results in an unnecessary cost in time and effort to reassemble the straps and retainers at their destination.

Some prior art strap retainers try to overcome this disadvantage by shaping the unlocked strap retainer in a mostly closed triangular shape, such that a portion of the unlocked retainer blocks the opening. The shape of these retainers makes it less likely that a webbing loop will accidentally slide out, but these retainers require significant distortion to lock them.

Other prior art strap retainers try to overcome this disadvantage by placing the locking member in a position where a webbing loop is less likely to slide out. However, nothing restrains the webbing loop from sliding out of the retainer.

Still other prior art strap retainers try to overcome this disadvantage by providing a sew tab, so that the strap retainer is sewn to the webbing. But when this style of retainer becomes damaged, it cannot merely be removed and replaced in the retail store because it is sewn to the webbing. The retainer and the attached webbing must be replaced together, causing unnecessary cost.

Accordingly, there is need for providing an improved strap retainer that overcomes one or more of these problems.

SUMMARY OF THE INVENTION

In one embodiment of the invention, a strap retaining apparatus may comprise an elongate member having a first end and a second end and formed into a partially closed loop, the elongate member having a substantially straight post segment near the first end; means for locking the first end to the second end, such that the strap retaining apparatus forms a closed loop when the first end is locked to the second end; and, a strap restrainer having a first member spaced from the post segment and extending approximately parallel to the post segment.

In another embodiment of the present invention, A child-retaining seat belt, comprising a first strap retainer and a second strap retainer, each strap retainer comprising: an elongate member having a first end and a second end and formed into a partially closed loop, the elongate member having a substantially straight post segment near the first end; mating locking members on the first end and the second end of the elongate member, such that the strap retaining apparatus forms a closed loop when the first end is locked to the second end; a strap restrainer having a first member spaced from the post segment and extending approximately parallel to the post segment; a first webbing portion affixed to a first buckle member, the first webbing portion comprising a first loop located between the restraining member and the post segment of the first strap retaining apparatus; and, a second webbing portion affixed to a second buckle member, the second webbing portion comprising a second loop located between the restraining member and the post segment of the second strap retaining apparatus.

BRIEF DESCRIPTION OF THE DRAWINGS

The present invention will be described in further detail with reference to the accompanying drawings, in which:

FIG. 1 is a plan view of an embodiment of a strap retainer in an unlocked position.

FIG. 2 is a plan view of the strap retainer of FIG. 1 in a locked position.

FIG. 3 is cross section through the strap retainer of FIG. 1 through the section A-A in FIG. 1.

FIG. 4 is a perspective view of the strap retainer of FIG. 1 in a locked position.

FIG. 7 is a perspective view of a third embodiment of a strap retainer.

FIG. 8 is another perspective view of the strap retainer of FIG. 7.

FIG. 9 is an end view of the strap retainer of FIG. 7.

DETAILED DESCRIPTION

Figure 5:
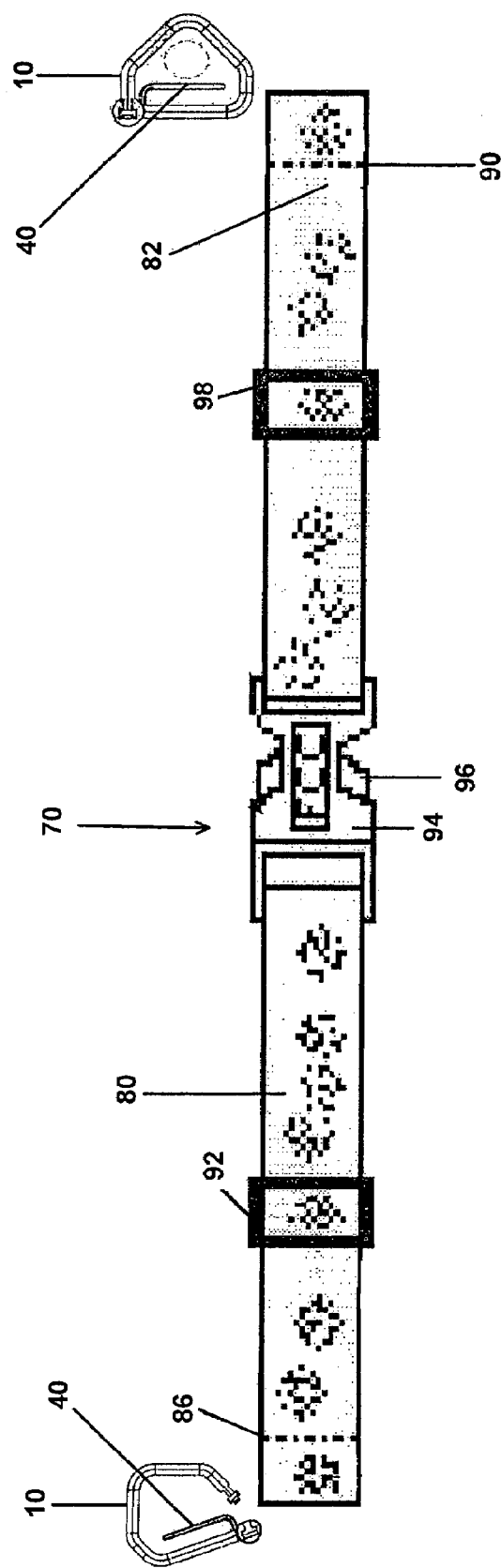
FIG. 5 is a plan view of a seatbelt, in accordance with an embodiment of the present invention.

Referring now to FIG. 1, the strap retaining apparatus of the present invention is shown. The strap fastener 10 comprises a resilient elongate member 20 having a first end 22 and a second end 24, and is shaped in a partially closed loop. The strap fastener 10 is flexible so that an operator can manipulate the strap fastener 10 from an un-locked, open position as shown in FIG. 1, into a locked, closed position as shown in FIG. 2.

The strap fastener may have an approximately straight segment or post 30 near the first end 22. An L-shaped restraining member 40 may be affixed to the elongate member 20. The restraining member 40 has a first portion 42 positioned adjacent to one the first end 22 and may extend approximately perpendicularly to the elongate member 20. A second portion 44 cantilevers from the first portion 42 and may extend approximately parallel to the straight segment 30. Preferably, as shown in FIGS. 1-2, the restraining member 40 may extend at least partially away from first end 22 and is located on an interior portion of the strap fastener 10.

The L-shaped restraining member 40 may be shaped and positioned so that a piece of strap webbing can pass between the restraining member 40 and the straight segment 30. When the webbing is placed under the restraining member 40, the restraining member 40 inhibits the webbing from sliding longitudinally along the elongate member 20. Thus, when the strap fastener 10 in its un-locked, open position is placed on a loop of webbing, the restraining member 40 keeps the strap fastener from sliding out of the webbing without manual force being applied.

The ends 22, 24 comprise means for locking the first end 22 to the second end 24 to put the strap fastener 10 in the closed position. Means for locking the first end 22 to the second end 24 comprise at least one first feature affixed to the first end 22 and at least one second feature affixed to the second end 24, where the first feature interlocks with the second feature when pressed together. In some embodiments, one of the features is an embossment 60 and the other feature is an aperture or slot 62, such that when pressed together, the embossment 60 cannot pull out through the aperture or slot 62, as exemplified by FIGS. 4 and 5. In other embodiments, one of the features is a barb, detent, or protrusion 104 and the other feature is an aperture or slot 108, such that when pressed together the barb 104 cannot pull out through the aperture or slot 108, as exemplified by FIG. 6.

In the embodiment of FIG. 1, the means for locking the ends in the closed position may comprise a projection 60 on the second end 24 that is received within recess 62 on the first end 22. The projection 60 may be frictionally engaged with recess 62. Alternatively, projection 60 and recess 62 may interact to provide a detent locking mechanism, such that projection 60 cannot be easily removed from recess 62 once they are engaged. The detent locking mechanism may be of any type known in the art, such as a dimple in one member that is received within a recess in the other member. Alternatively, the detent locking mechanism may be a pawl on one member that biases upon initial engagement and is thereafter snaps into engagement with a shoulder or notch.

In one embodiment, the means for locking the ends together make a click sound when an operator locks the ends together. The click sound gives the operator audible feedback to know when the fastener is locked.

Interlocking fasteners for connecting two plastic parts are very well known in the art. This disclosure is not meant to be limited to the specific embodiments described herein. For example, the L-shaped restraining member 40 may be integrated into many existing styles of strap fastener. Strap fasteners are disclosed in U.S. Pat. No. 5,781,970 to Anscher, U.S. Pat. No. 5,940,944 to Anscher, U.S. Pat. No. 6,044,528 to Schottin, U.S. Pat. No. 6,088,885 to Galbreath, U.S. Pat. No. 6,101,687 to Giampavolo, et al., and U.S. Pat. No. 6,484,375 to Nishida et al. All of these fasteners and a plurality of others could readily be modified to include the L-shaped restraining member of the present invention, and the disclosures of each are hereby incorporated herein by reference.

In one embodiment, the strap fastener 10 with L-shaped restraining member 40 may be used to fasten a child strap apparatus 70 to a shopping cart. The child strap apparatus 70 may comprise a first length of strap webbing 80, a second length of strap webbing 82, and two strap fasteners 10. The child strap apparatus 70 may further comprise a plurality of buckles for adjusting the length of the strap, and for connecting the first length of webbing 80 to the second length 82. In the embodiment of FIG. 7, buckle 92 is a tri-slide buckle known in the art and used for adjusting the length of webbing 80. Buckle 94 is a releasable "snap-in" type buckle, which can be coupled to its paired buckle 96 on the opposite webbing 82. Releasable buckles that couple together are known in the art for coupling the first webbing 80 to the second webbing 82, such as U.S. Pat. No. 5,791,026 to Anscher. Buckle 98 is a tri-slide buckle used for adjusting the length of webbing 82. By adjusting the tri-slide buckles 92, 98, the user can make the child strap apparatus 70 a comfortable length. It should be recognized that any suitable and functionally equivalent buckles could be used with the present invention. An example of a buckle design suitable for use with the present invention is disclosed in U.S. Pat. No. 5,791,026, which is hereby incorporated herein by reference in its entirety.

The child strap apparatus 70 of FIG. 7 comprises the webbing 80, having a first end 84 folded over the center bar of the tri-slide buckle 92 and sewn. A second end 86 of webbing 80 is looped through the releasable buckle 94 and then passed back through the tri-slide buckle 92. The second end 86 is then folded over and sewn to form a loop for one of the strap fastener 10 to pass through. The child strap apparatus 70 further comprises the webbing 82, having a first end 88 folded over the center bar of the tri-slide buckle 98 and sewn. A second end 90 of webbing 82 is looped through the releasable buckle 96 and then passed back through the tri-slide buckle 98. The second end 90 is folded over and sewn to form a loop for the second strap fastener 10 to pass through.

In an alternate embodiment, the second end 86, 90 of webbing is sewn to the releasable buckle 94, 96. In this embodiment, the loop formed by passing the second end 86, 90 through the tri-slide buckle 92, 98 is used to hold the strap fastener 10.

In further embodiments, only one tri-slide buckle 92 may be used. In these embodiments, the first end 88 of webbing 82 is sewn to the releasable buckle 96, and the second end 90 is folded over and sewn to form a loop for the second strap fastener 10 to pass through. In this way, the length of webbing 82 is not adjustable. The length of the child strap apparatus of this embodiment is adjusted by the moving the tri-slide buckle 92 on webbing 80.

Each webbing portion 80, 82 is attached to its respective strap fastener 10 by passing the fastener through the loop at the end of the webbing so that the webbing rests between the L-shaped restraining member 40 and the straight segment 30 of the fastener. The L-shaped restraining member 40 at least substantially inhibits the webbing loop from sliding out of the fastener without manual effort. This feature allows for the strap fastener 10 to be shipped as part of the child strap apparatus 70 without it separating from the webbing during shipment. The strap fastener 10 can also be shipped individually, or in bulk as needed. If the strap fastener 10 is ever broken, the restraining member 40 allows for replacement of only the fastener and not the entire child strap apparatus, because the fastener is not permanently attached to the strap.

When the child strap apparatus 70 will be installed on shopping carts that nest together, having only one tri-slide buckle 92 may be less advantageous than having two. Straps with one tri-slide may require a longer webbing portion to accommodate various sized children. Having a longer webbing portion may increase the likelihood that it will tangle among other carts when nested together. Tangled straps can cause breakage when customers and store employees pull the tangled carts apart. When using two tri-slides, the length of each webbing portion can be shortened, reducing the likelihood of tangling when nesting carts.

The webbing 80, 82 may be made from nylon, polyester, polypropylene, cotton, or other suitable webbing material. In a preferred embodiment, the webbing width may be 2.5 centimeters (1 inch) or other suitable width, and the length of the webbing 80, 82 may sized to accommodate different size carts. In one embodiment, the over-all length of the child strap apparatus 70 may be approximately 35.5 centimeters (15 inches) when both tri-slide buckles 92, 98 are adjusted in, and approximately 58.5 centimeters (23 inches) when both tri-slide buckles 92, 98 are adjusted out. A safety warning or other artwork may be placed onto the webbing.

The strap fasteners and tri-slide and fastening buckles may be made from any suitable plastic material, including but not limited to nylon, super tough nylon such as Zytel® ST801 or Zytel® 409 by DuPont®, Capron® BU501 by BASF®, Acetal, also known as polyoxymethylene, such as Delrin® by DuPont®. As stated earlier, an example of a buckle that is suitable for use with the present invention is disclosed in U.S. Pat. No. 5,791,026. Optionally, the female buckle member of the '026 patent may comprise Zytel® ST801 and the male buckle member may comprise Zytel® 409. Additionally, the legs of the male buckle member may be manufactured with a thickness such that the buckle has a sufficient average release force of to make the buckle childproof. In an embodiment of the present invention, the buckle has a release force of approximately five pounds or greater.

Any of a plurality of other materials or buckles could also be used without deviating from the scope of the present invention. Material requirements may vary according to how the strap fastener will be used. For example, a shopping cart may have to comply with industry requirements such as a Standard Consumer Safety Performance Specification for Shopping Carts. The strap fasteners and buckles may be impact resistant and weather resistant.

While the description here describes the webbing being sewn during assembly, it is contemplated that other techniques besides traditional sewing may be used to fasten the webbing to the buckles. In lieu of sewing, it is contemplated that some embodiments will be assembled by ultrasonic or other welding techniques. It is further contemplated that adhesives, rivets, crimping fasteners, and other fastening methods may readily be employed to assemble the webbing to the buckles without altering the scope of the present invention.

A method of assembling the child strap apparatus comprises providing the child strap apparatus 70 with the first and second strap fasteners positioned within the webbing loops; wrapping the elongate member of the first strap fastener around a first frame member of a shopping cart; engaging the means for locking the first end and second end of the first strap fastener to form a closed loop around the shopping cart frame; wrapping the elongate member of the second strap fastener around a second frame member of the shopping cart; and engaging the means for locking the first end and second end of the second strap fastener to form a closed loop around the shopping cart frame.

Figure 6:
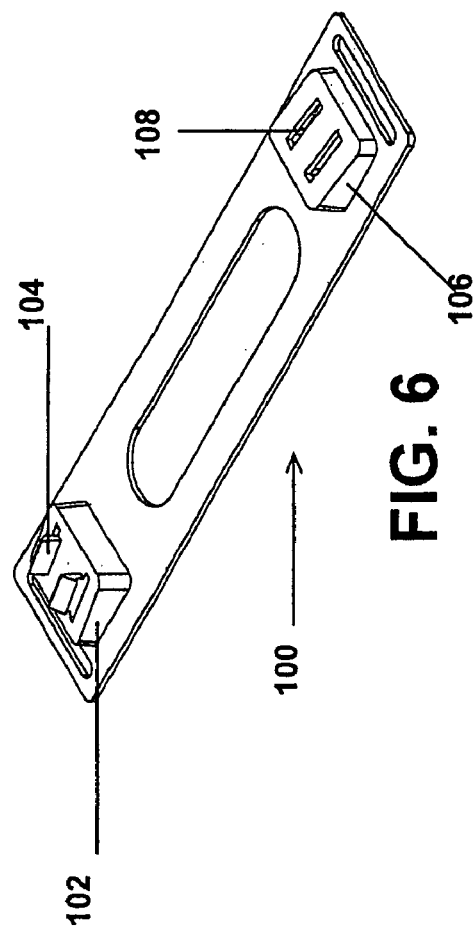
FIG. 6 is a perspective view of a second embodiment of a strap retainer.

A second embodiment of a strap retainer is illustrated in FIG. 6. In this embodiment, strap retainer 100 comprises a longitudinally extending member that may have projections 102, 106 on opposing ends. Projection 102 may include one or more detent locking elements, protrusions or catches 104 that are received in recesses 108 in projection 106. When protrusions 104 are inserted into recesses 108, a portion of recesses 108 is received with a shoulder in recess 108, forming a detent lock. In operation, the strap retainer 100 may be attached to a strap via adhesive, ultrasonic welding, sewing, or other method known in the art. The bottom of the strap retainer 100 may be aligned relative to the strap so that the longitudinal axes of the strap and strap retainer are parallel, such that as the strap retainer 100 folds on itself and locks together, the strap end folds on itself as well.

A third embodiment of strap retainer 200 is illustrated in FIGS. 7-9. This embodiment is similar to the embodiment 100 of FIG. 6 in how the strap retainers 100, 200 are aligned with the strap, and that both embodiments 100, 200 may have one end looped around a shopping cart post, folded over onto itself, and attached to the other end. However, the locking mechanism of strap retainer 200 may comprise a projection 202 on one end that includes a projection 204 that has two detent locking elements 206 thereon. The other end may comprise projection 208 that comprises transverse slot 210 that includes interior shoulders 212 that engage detent locking members 206 when locked. To fasten the two ends together, the strap retainer 200 is folded over on itself, and projection 204 is inserted into slot 201 from the side. Upon full insertion of projection 204 into slot 210, projections 206 click into engagement with shoulders 212.

Figure 10:
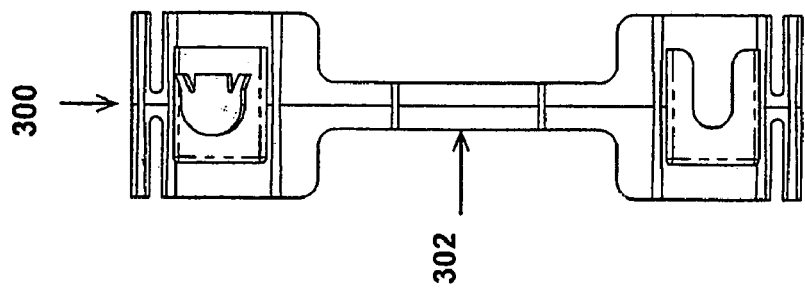
FIG. 10 is a perspective view of a fourth embodiment of a strap retainer.

A fourth embodiment of a strap retainer 300 is illustrated in FIG. 10. This embodiment is similar to the embodiment illustrated in FIGS. 7-9, except that the width of the strap retainer middle portion 302 is reduced. It is also contemplated that strap retainer 100, illustrated in FIG. 6, may be manufactured with a middle portion of reduced width. Additionally, it is contemplated that any of the strap retainers 100, 200, 300 may be provided in either a planar or partially folded-over resting state.

Although the present invention has been described above in detail, the same is by way of illustration and example only and is not to be taken as a limitation on the present invention.

What is claimed is:

1. A child-retaining seat belt, comprising:
    a first strap retainer and a second strap retainer, each strap retainer comprising:
        an elongate member having a first end and a second end and formed into a partially closed loop, the elongate member having a substantially straight post segment near the first end;
        mating locking members on the first end and the second end of the elongate member, such that the strap retainer forms a closed loop when the first end is locked to the second end;
        a strap restrainer having a first member spaced from the post segment and extending approximately parallel to the post segment;
    a first webbing portion affixed to a first buckle member, the first webbing portion comprising a first loop located between the strap restrainer and the post segment of the first strap retainer; and,
    a second webbing portion affixed to a second buckle member, the second webbing portion comprising a second loop located between the strap restrainer and the post segment of the second strap retainer.

2. The seat belt of claim 1, wherein at least one of the buckle members comprise super tough nylon.

3. The seat belt of claim 1, wherein at least one of the buckle members comprise acetal.

4. The seat belt of claim 1, wherein the first buckle member is a female buckle member, the female buckle member comprising super tough nylon.

5. The seat belt of claim 4, wherein the second buckle member is a male buckle member, the male buckle member comprising super tough nylon.

6. The seat belt of claim 1, wherein the second buckle member is a male buckle member, the male buckle member comprising super tough nylon.

7. The seat belt as recited in claim 1, further comprising a first tri-slide buckle operably connected to the first webbing portion.

8. The seat belt as recited in claim 7, further comprising a second tri-slide buckle operably connected to the second webbing portion.

9. A method of shipping a seat belt, comprising the steps of:
(a) providing a seat belt comprising:
   a first strap retainer and a second strap retainer, each strap retainer having an open position and a closed position, each strap retainer comprising:
   an elongate member having a first end and a second end and formed into a partially closed loop, the elongate member having mating locking members on the first end and the second end of the elongate member, such that the strap retainer forms a closed loop when the first end is locked to the second end; and,
   a strap restrainer having a first member spaced from and extending generally parallel to a portion of the elongate member;
   a first strap affixed to a first buckle member, the first strap including a first end loop, the loop being situated between the strap restrainer and the elongated member of the first strap retainer, where the strap remains substantially engaged with the strap retainer when the strap retainer is in the open position; and,
   a second strap affixed to a second buckle member, the second strap including a second end loop, the loop being situated between the strap restrainer and the elongated member of the second strap retainer, where the strap remains substantially engaged with the strap retainer when the strap retainer is in the open position; and,
(b) shipping the seat belt with the strap retainers in the open position.

* * * * *